United States Patent
Wen (10) Patent No.: US 8,627,173 B2
(45) Date of Patent: Jan. 7, 2014

(54) METHOD, APPARATUS, AND USER EQUIPMENT FOR CHECKING FALSE ALARM

(75) Inventor: Xue Wen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 13/159,748

(22) Filed: Jun. 14, 2011

(65) Prior Publication Data

US 2011/0246865 A1    Oct. 6, 2011

Related U.S. Application Data

(63) Continuation of application No. PCT/CN2009/075630, filed on Dec. 16, 2009.

(30) Foreign Application Priority Data

Dec. 16, 2008   (CN) .......................... 2008 1 0241223

(51) Int. Cl.
    *H03M 13/00*     (2006.01)
(52) U.S. Cl.
    USPC .......................................................... 714/758
(58) Field of Classification Search
    USPC .................. 714/746, 758, 799; 370/329
    See application file for complete search history.

(56) References Cited

U.S. PATENT DOCUMENTS

| | | | | |
|---|---|---|---|---|
| 6,519,738 | B1 * | 2/2003 | Derby ........................... | 714/781 |
| 8,315,185 | B2 * | 11/2012 | Chan ............................. | 370/252 |
| 8,374,109 | B2 * | 2/2013 | Luo et al. ...................... | 370/310 |
| 2008/0209302 | A1 | 8/2008 | Yang et al. | |
| 2009/0077457 | A1 * | 3/2009 | Ramesh et al. ............... | 714/807 |
| 2009/0257385 | A1 * | 10/2009 | Meylan et al. ................ | 370/329 |

FOREIGN PATENT DOCUMENTS

| | | |
|---|---|---|
| CN | 1440152 A | 9/2003 |
| CN | 1710895 A | 12/2005 |
| CN | 101127583 A | 2/2008 |

OTHER PUBLICATIONS

3 GPP TSG RAN WG1 Meeting #54bis, Prague, Czech, Sep. 29-Oct. 3, 2008, LS Response to Semi-Persistent Scheduling Activation with single PDCCH, 1 page.
3GPP TSG-RAN Meeting #55, Prague, Cz, Nov. 10-14, 2008, "PDCCH validation for seim-persistent scheduling" 7 pages.
Written Opinion of the International Searching Authority mailed Mar. 25, 2010 in corresponding International Patent Application PCT/CN2009/075630.
International Search Report, mailed Mar. 25, 2010, in corresponding International Application No. PCT/CN2009/075630 (4 pp.).

* cited by examiner

*Primary Examiner* — Shelly A Chase
(74) *Attorney, Agent, or Firm* — Staas & Halsey LLP (57)  ABSTRACT

In the field of mobile telecommunications, a method for checking a false alarm is provided. In the method, after a user in a Long Term Evolution (LTE) system receives control signaling for scheduling physical resources, Cyclic Redundancy Check (CRC) is performed on the control signaling; and if the CRC is passed, false alarm check is performed on the control signaling according to false alarm check bit(s) and padding bit(s) in the control signaling. An apparatus and a user equipment (UE) for checking a false alarm are also provided. According to the method, the apparatus, and the UE for checking a false alarm, the number of bits participating in the false alarm check is increased, thereby reducing the probability of false alarm occurrence, and improving receiving performance of the control signaling.

19 Claims, 5 Drawing Sheets

METHOD, APPARATUS, AND USER EQUIPMENT FOR CHECKING FALSE ALARM

CROSS-REFERENCE TO RELATED APPLICATIONS

This application is a continuation of International Application No. PCT/CN2009/075630, filed on Dec. 16, 2009, which claims priority to Chinese Patent Application No. 200810241223.1, filed on Dec. 16, 2008, both of which are hereby incorporated by reference in their entireties.

FIELD OF THE INVENTION

The present invention relates to the field of wireless telecommunications, and in particular, to a method, an apparatus, and a user equipment (UE) for checking a false alarm in a wireless telecommunication system.

BACKGROUND OF THE INVENTION

Long Term Evolution (LTE) is a technical plan developed by the 3rd Generation Partnership Project (3GPP) standardization organization based on the Universal Mobile Telecommunications System (UMTS). The LTE will bring faster and smoother wireless telecommunication networks for mobile users. Currently, the LTE standardization is centralized on the physical layer, the air interface protocol, and the network architecture.

In an LTE system, Physical Downlink Control Channel (PDCCH) is one of the physical layer channels, which is used to transmit the downlink control signaling of the physical layer. The control signaling may include the control messages required for data transmission such as physical resource allocation and modulation mode.

In the LTE system, the physical layer resources are generally scheduled in two ways: dynamic scheduling and persistent scheduling. In the persistent scheduling, resources are reserved by the system, and keep unchanged in the process of sending or receiving data. In the dynamic scheduling, resources are allocated by the system dynamically, and vary with time dynamically in the process of sending or receiving data. Another resource scheduling mode defined in the LTE is semi-persistent scheduling. In the semi-persistent scheduling, the resources are scheduled persistently for initial transmission of the data; and, if the initial transmission is erroneous, Hybrid Automatic Repeat Request (HARQ) retransmission is started, and the resources are scheduled dynamically in the retransmission. After receiving control signaling, sent by the base station, which indicates that the semi-persistent scheduling is activated, a user believes that the corresponding time-frequency resources are reserved for initial transmission by the base station at the time of sending the activation control signaling and the control message indication. The user may send data (uplink) or receive data (downlink) on the reserved resources.

When the user does not need to send or receive data temporarily, that is, the user does not need to use the uplink or downlink reserved resources semi-persistently scheduled, the base station may release the uplink or downlink reserved resources through control signaling. If the channel, on which the uplink or downlink reserved resources in semi-persistent scheduling are configured for the user, is not in good condition or there are other reasons, the base station may reconfigure the uplink or downlink reserved resources through the control signaling.

The activation control signaling has high requirements for receiving performance, especially for the probability of false alarm; therefore, in the prior art, a false alarm of the activation control signaling is checked by using a group of check bits. This group of false alarm check bit(s) belongs to an information field in the format of the activation control signaling. A schematic principle of the false alarm check is as follows: The base station and the user make an appointment that all false alarm check bit(s) are set to 0. Then, Cyclic Redundancy Check (CRC) is passed in the detection of the activation control signaling, but not all of the false alarm check bit(s) are 0, the user determines that the control signaling does not belong to the user itself (that is, a false alarm occurs); and if all of the false alarm check bit(s) are 0, the user determines that the control signaling belongs to the user itself However, in the prior art, the method for checking a false alarm needs to be improved, so as to further reduce the probability of false alarm, and improve the receiving performance of the control signaling.

SUMMARY OF THE INVENTION

Embodiments of the present invention provide a method and a UE for checking a false alarm, so as to improve receiving performance of control signaling, and further reduce the probability of false alarm occurrence.

An aspect of the present invention provides a method for checking a false alarm, in which a user performs a false alarm check on control signaling, where the method includes: receiving control signaling for scheduling physical resources in an LTE system; and performing false alarm check on the control signaling according to false alarm check bit(s) and padding bit(s) in the control signaling when the control signaling passes CRC.

Another aspect of the present invention further provides an apparatus for checking a false alarm, in which a user performs a false alarm check on control signaling, where the false alarm check device includes a signaling receiving unit and a check unit.

The signaling receiving unit is configured to receive the control signaling for scheduling physical resources in an LTE system. The check unit is configured to perform the false alarm check on the control signaling according to false alarm check bit(s) and padding bit(s) in the control signaling when the control signaling passes CRC.

An embodiment of the present invention further provides a UE including the above apparatus for checking a false alarm. The UE includes the above apparatus for checking a false alarm, configured to perform false alarm check on received control signaling.

According to the method and the UE for checking a false alarm in the present invention, the false alarm check is performed on the control signaling according to the false alarm check bit(s) and the padding bit(s), so that the number of bits participating in the false alarm check is increased, thereby reducing the probability of false alarm occurrence, and improving the receiving performance of the control signaling.

DETAILED DESCRIPTION OF THE EMBODIMENTS

In order to make the objectives, technical solutions, and advantages of the present invention more comprehensible, the present invention is described in further detail below with reference to embodiments and accompanying drawings.

In the implementation of the present invention, the inventor finds that a type of special bits called padding bit(s) exist in control signaling, and this type of bits usually do not transmit information, and is filled behind information field bits only for the purpose that the size of the control signaling satisfies a certain requirement. For example, in the case of a system bandwidth of 5 MHz, the information field bits of a control signaling format 1A are 24 bits. Because 24 bits may cause an error of uplink HARQ feedback, one padding bit is added behind the information field bits, so that extended information field bits are 25 bits. The 25 bits do not cause an error of uplink HARQ feedback, and the addition of one bit has little impact on transmission performance of the control signaling. Furthermore, the padding bit(s) may be used for other purposes. For example, one purpose is to make the sizes of extended information fields of control signaling in some formats (for example, format 0 and format 1A) equal; and another purpose is to make the sizes of extended information fields of control signaling in some formats (for example, format 1 and format 1A) unequal. Furthermore, the inventor of the present invention finds that the padding bit(s) may even reach 3 bits in control signaling of some formats under some system bandwidth.

Therefore, embodiments of the present invention provide a false alarm check technology, in which after a user in an LTE system receives control signaling for scheduling physical resources, CRC is performed on the control signaling; and if the CRC is passed, false alarm check is performed on the control signaling according to false alarm check bit(s) and padding bit(s) in the control signaling. In this way, the number of bits participating in the false alarm check is increased, thereby reducing the probability of false alarm occurrence, and improving receiving performance of the control signaling.

Figure 1:
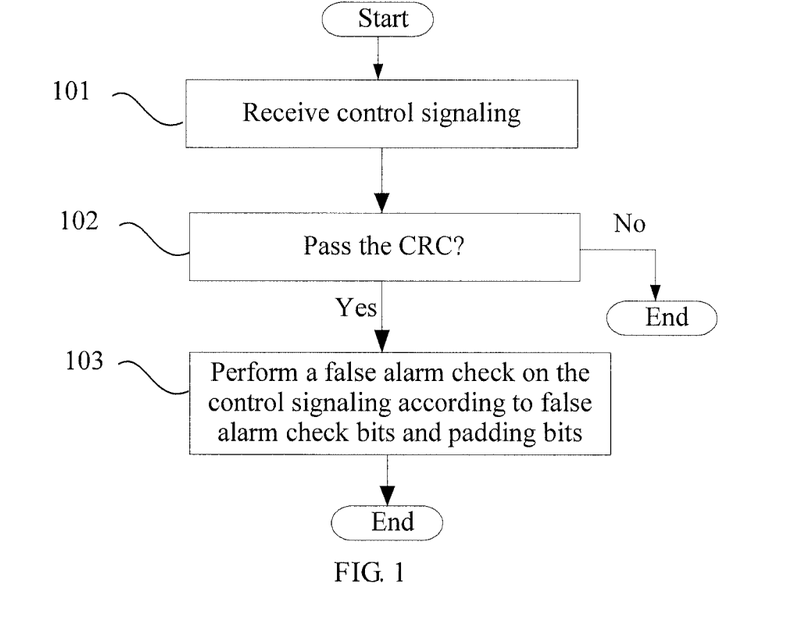
FIG. 1 is a schematic flow chart of a method for checking a false alarm according to an embodiment of the present invention.

FIG. 1 is a schematic flow chart of a false alarm check method according to an embodiment of the present invention. As shown in FIG. 1, the method includes the following steps:

Step 101: Receive control signaling.

In this embodiment, the control signaling received by a user may be control signaling for scheduling physical resources in an LTE system.

Step 102: Perform CRC on the received control signaling. If the control signaling passes the CRC, step 103 is performed; if the control signaling fails in the CRC, the process ends.

Persons skilled in the art may understand that a CRC process performed on the received control signaling is the same as that in the prior art, and therefore the CRC process is not described herein again.

Step 103: Perform false alarm check on the control signaling according to false alarm check bit(s) and padding bit(s).

According to the method for checking a false alarm provided in the embodiment of the present invention, the number of bits participating in the false alarm check is increased, thereby reducing the probability of false alarm occurrence, and improving receiving performance of the control signaling.

Figure 2:
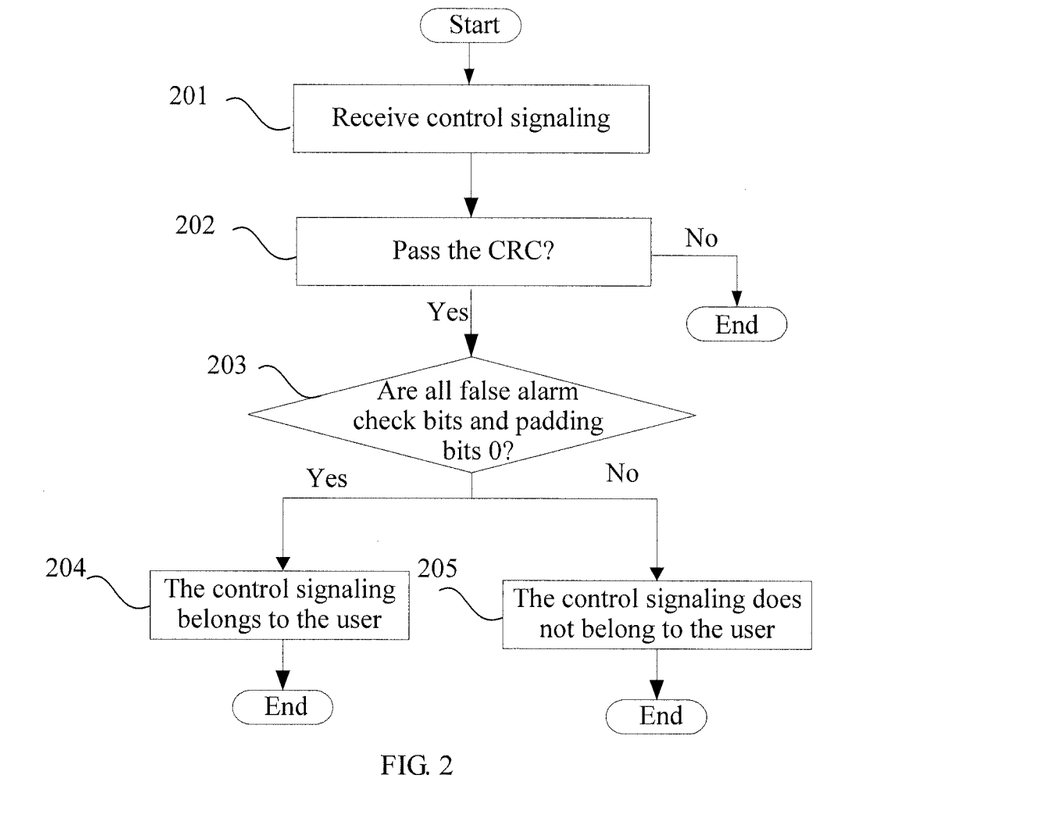
FIG. 2 is a schematic flow chart of a method for checking a false alarm according to another embodiment of the present invention.

FIG. 2 is a schematic flow chart of a method for checking a false alarm according to an embodiment of the present invention. As shown in FIG. 2, the method includes the following steps:

Step 201: Receive control signaling.

In this embodiment, the control signaling received by a user may be control signaling for activating, releasing, or reconfiguring a semi-persistent scheduling mode in an LTE system. Definitely, the control signaling may also be control signaling for activating, releasing, or reconfiguring a persistent scheduling mode.

Step 202: Perform CRC on the received control signaling. If the control signaling passes the CRC, step 203 is performed; if the control signaling fails in the CRC, the process ends.

Persons skilled in the art may understand that a CRC process performed on the received control signaling is the same as that in the prior art, and therefore the CDR process is not described herein again.

Step 203: Check false alarm check bit(s) and padding bit(s) in the control signaling at the same time.

In this embodiment, it is assumed that M alarm check bits and N padding bit(s) exist in the control signaling. Step 204 is performed if all of the M false alarm check bit(s) and N padding bit(s) are 0; if not all of the M false alarm check bit(s) and N padding bit(s) are 0, step 205 is performed.

Step 204: Determine that the received control signaling belongs to the user.

Step 205: Determine that the received control signaling does not belong to the user (or the control signaling is a false alarm).

In this embodiment, because the padding bit(s) participate in the false alarm check at the same time, when all M false alarm check bit(s) are 0 and not all N padding bit(s) are 0, the control signaling is actually a false alarm event. Therefore, both the M false alarm check bit(s) and N padding bit(s) participate in the false alarm check at the same time, so that the number of bits participating in the false alarm check is increased, thereby reducing the probability of false alarm occurrence, and improving receiving performance of the control signaling.

Figure 3:
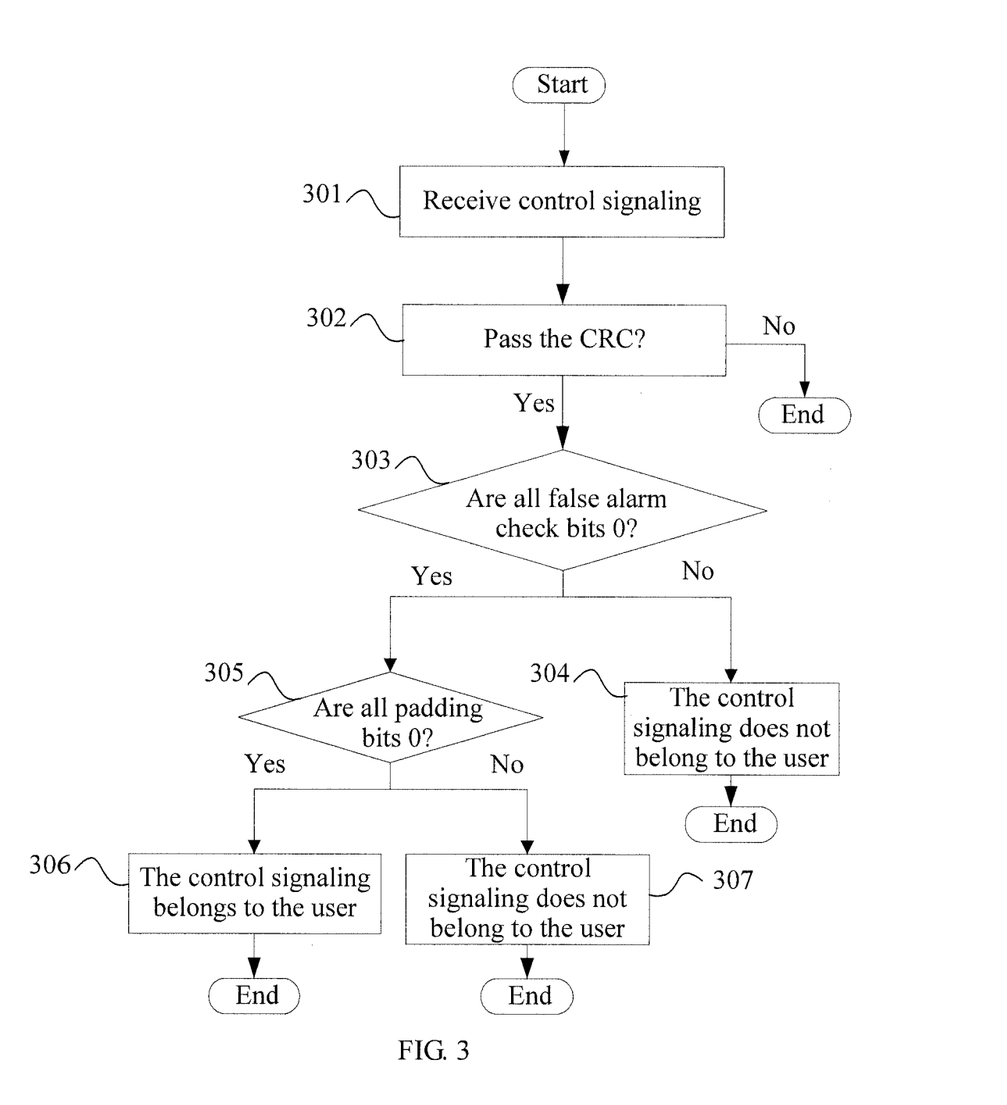
FIG. 3 is a schematic flow chart of a method for checking a false alarm according to another embodiment of the present invention.

FIG. 3 is a schematic flow chart of another method for checking a false alarm according to an embodiment of the present invention. As shown in FIG. 3, the method includes the following steps:

Steps 301-302 may be the same as steps 201-202 as shown in FIG. 2, and are not described herein again.

Step 303: Check false alarm check bit(s) in the control signaling.

In this embodiment, it is assumed that M false alarm check bit(s) and N padding bit(s) exist in the control signaling. In this step, the M false alarm check bit(s) are firstly checked, and if not all of the M false alarm check bit(s) are 0, step 304 is performed; if all of the M false alarm check bit(s) are 0, step 305 is performed.

Step 304: Determine that the received control signaling does not belong to the user.

Step 305: Further check the padding bit(s) in the control signaling.

In this step, if all of the N padding bit(s) are 0, step 306 is performed; if not all of the N padding bit(s) are 0, step 307 is performed.

Step 306: Determine that the received control signaling belongs to the user.

Step 307: Determine that the received control signaling does not belong to the user.

In this embodiment, both the M false alarm check bit(s) and the N padding bit(s) participate in the false alarm check, in which the false alarm check is first performed on the M false alarm check bit(s), and then performed on the N padding bit(s), so that the number of bits participating in the false alarm check is increased, thereby reducing the probability of false alarm occurrence, and improving receiving performance of the control signaling.

Figure 4:
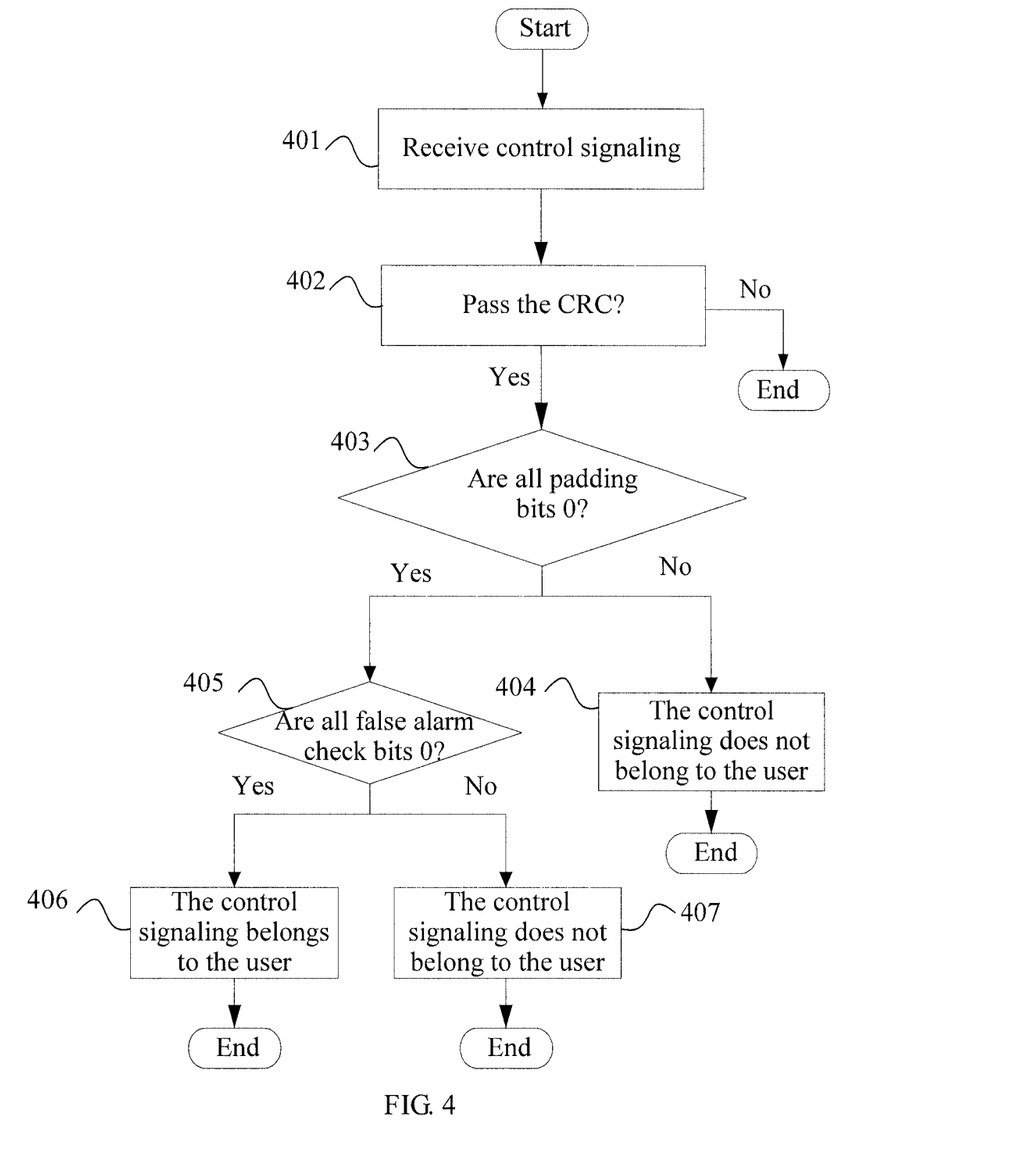
FIG. 4 is a schematic flow chart of a method for checking a false alarm according to another embodiment of the present invention.

FIG. 4 is a schematic flow chart of another method for checking a false alarm according to an embodiment of the present invention. As shown in FIG. 4, the method includes the following steps:

Steps 401 to 402 may be the same as steps 201 to 202 as shown in FIG. 2, and are not described herein again.

Step 403: Check padding bit(s) in the control signaling.

In this embodiment, it is assumed that M false alarm check bit(s) and N padding bit(s) exist in the control signaling. In this step, the N padding bit(s) are checked first, and if not all of the N padding bit(s) are 0, step 404 is performed; if all of the N padding bit(s) are 0, step 405 is performed.

Step 404: Determine that the received control signaling does not belong to the user.

Step 405: Further check the false alarm check bit(s) in the control signaling.

In this step, if all of the M false alarm check bit(s) are 0, step 406 is performed; If not all of the M false alarm check bit(s) are 0, step 407 is performed.

Step 406: Determine that the received control signaling belongs to the user.

Step 407: Determine that the received control signaling does not belong to the user.

In this embodiment, both the M false alarm check bit(s) and the N padding bit(s) participate in the false alarm check, in which the false alarm check is first performed on the N padding bit(s), and then performed on the M false alarm check bit(s), so that the number of bits participating in the false alarm check is increased, thereby reducing the probability of false alarm occurrence, and improving receiving performance of the control signaling.

Persons of ordinary skill in the art may understand that all or a part of the steps of the method for checking a false alarm according to the embodiments may be implemented by a program instructing relevant hardware. The program may be stored in a computer readable storage medium. When the program is run, all or a part of the steps of the method are performed. The storage medium is, for example, a Read-Only Memory (ROM)/Random Access Memory (RAM), a magnetic disk, or an optical disk.

Figure 5:
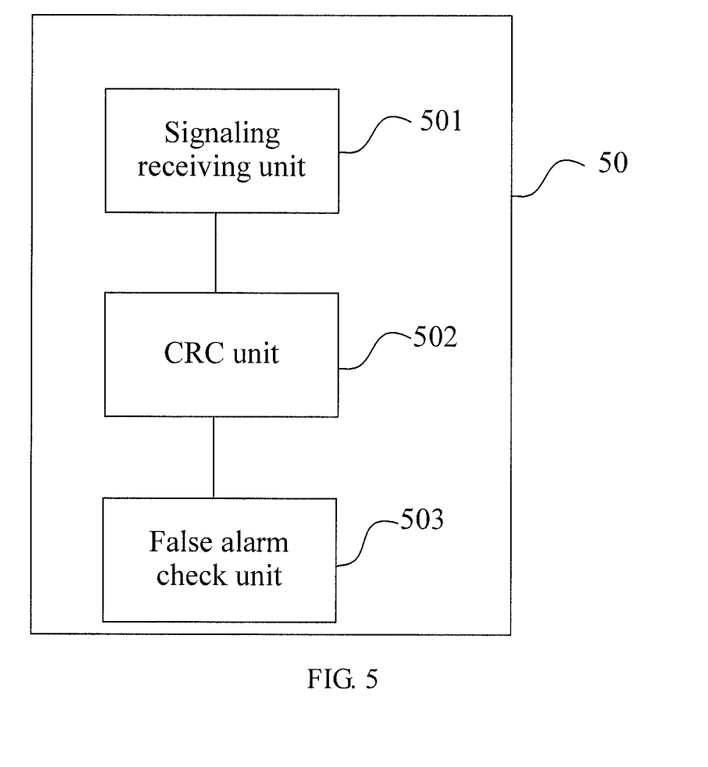
FIG. 5 is a schematic structural view of an apparatus for checking a false alarm according to an embodiment of the present invention.

FIG. 5 is a schematic structural view of an apparatus for checking a false alarm according to an embodiment of the present invention. The apparatus 50 for checking a false alarm may be configured to perform false alarm check on control signaling by a user in an LTE system. As shown in FIG. 5, the apparatus 50 for checking a false alarm includes a signaling receiving unit 501, a CRC unit 502, and a false alarm check unit 503.

The signaling receiving unit 501 is configured to receive control signaling for scheduling physical resources in the LTE system.

The CRC unit 502 is configured to perform CRC on the control signaling received by the signaling receiving unit 501.

The false alarm check unit 503 is configured to perform false alarm check on the control signaling according to false alarm check bit(s) and padding bit(s) in the control signaling when the received control signaling passes the CRC.

In the apparatus 50 for checking a false alarm provided in this embodiment, the false alarm check is performed on the control signaling according to the false alarm check bit(s) and the padding bit(s), so that the number of bits participating in the false alarm check is increased, thereby reducing the probability of false alarm occurrence, and improving receiving performance of the control signaling.

The false alarm check unit 503 may perform the false alarm check on the control signaling according to the false alarm check bit(s) and the padding bit(s) in the control signaling in multiple specific modes, which are, for example, as follows:

Mode 1: The false alarm check unit 503 is configured to check the false alarm check bit(s) and the padding bit(s) in the control signaling at the same time, and if all of the false alarm check bit(s) and the padding bit(s) are 0, the false alarm check unit 503 may determine that the received control signaling belongs to the user; if not all of the false alarm check bit(s) and the padding bit(s) are 0, the false alarm check unit 503 may determine that the received control signaling does not belong to the user.

Mode 2: The false alarm check unit 503 is configured to first check the false alarm check bit(s), and if not all of the false alarm check bit(s) are 0, the false alarm check unit 503 may determine that the received control signaling does not belong to the user; if all of the false alarm check bit(s) are 0, the false alarm check unit 503 is further configured to check the padding bit(s), and if all of the padding bit(s) are 0, the false alarm check unit 503 may determine that the received control signaling belongs to the user; if not all of the padding bit(s) are 0, the false alarm check unit 503 may determine that the received control signaling does not belong to the user.

Mode 3: The false alarm check unit 503 is configured to first check the padding bit(s), and if not all of the padding bit(s) are 0, the false alarm check unit 503 may determine that the received control signaling does not belong to the user; if all of the padding bit(s) are 0, the false alarm check unit 503 is further configured to check the false alarm check bit(s), and if all of the false alarm check bit(s) are 0, the false alarm check unit 503 may determine that the received control signaling belongs to the user; if not all of the false alarm check bit(s) are 0, the false alarm check unit 503 may determine that the received control signaling does not belong to the user.

Persons skilled in the art may understand that, the units of the apparatus 50 for checking a false alarm in the embodiment may be combined into one unit, or further divided into a plurality of sub-units. Furthermore, the apparatus 50 for checking a false alarm may be one logic unit or physical unit of the UE in the LTE system.

Persons skilled in the art may understand that, the above descriptions are merely preferred embodiments of the present invention, but are not intended to limit the protection scope of the present invention. Any modification, equivalent replacement, and improvement made without departing from the spirit and principle of the present invention shall fall within the protection scope of the present invention.

What is claimed is:

1. A method for checking a false alarm, where a user performs a false alarm check on control signaling, comprising:

receiving the control signaling;

performing Cyclic Redundancy Check (CRC) on the control signaling; and performing the false alarm check on the control signaling according to false alarm check bit(s) and padding bit(s) in the control signaling when the control signaling passes the CRC.

2. The method according to claim 1, wherein the performing of the false alarm check on the control signaling according to the false alarm check bit(s) and the padding bit(s) in the control signaling comprises:

checking the false alarm check bit(s) and the padding bit(s) in the control signaling at the same time; and if all of the false alarm check bit(s) and the padding bit(s) are 0, determining that the control signaling belongs to the user; if not all of the false alarm check bit(s) and the padding bit(s) are 0, determining that the control signaling does not belong to the user.

3. The method according to claim 1, wherein the performing of the false alarm check on the control signaling according to the false alarm check bit(s) and the padding bit(s) in the control signaling comprises:

checking the false alarm check bit(s);

if not all of the false alarm check bit(s) are 0, determining that the control signaling does not belong to the user; if all of the false alarm check bit(s) are 0, further checking the padding bit(s); and if all of the padding bit(s) are 0, determining that the control signaling belongs to the user; if not all of the padding bit(s) are 0, determining that the control signaling does not belong to the user.

4. The method according to claim 1, wherein the performing of the false alarm check on the control signaling according to the false alarm check bit(s) and the padding bit(s) in the control signaling comprises:

checking the padding bit(s);

if not all of the padding bit(s) are 0, determining that the control signaling does not belong to the user; if all of the padding bit(s) are 0, further checking the false alarm check bit(s); and if all of the false alarm check bit(s) are 0, determining that the control signaling belongs to the user; if not all of the false alarm check bit(s) are 0, determining that the control signaling does not belong to the user.

5. The method according to claim 1, wherein the control signaling is control signaling for activating physical resources, or control signaling for releasing physical resources, or control signaling for reconfiguring physical resources.

6. The method according to claim 1, wherein the control signaling is control signaling for scheduling physical resources in a Long Term Evolution (LTE) system.

7. An apparatus for checking a false alarm, where a user performs a false alarm check on control signaling, comprising:

a signaling receiving unit, configured to receive the control signaling;

a Cyclic Redundancy Check (CRC) unit, configured to perform CRC on the control signaling received by the signaling receiving unit; and a false alarm check unit, configured to perform false alarm check on the control signaling according to false alarm check bit(s) and padding bit(s) in the control signaling when the control signaling passes the CRC.

8. The apparatus according to claim 7, wherein:

the false alarm check unit is further configured to check the false alarm check bit(s) and the padding bit(s) in the control signaling at the same time, to determine that the control signaling belongs to the user if all of the false alarm check bit(s) and the padding bit(s) are 0, and to determine that the control signaling does not belong to the user if not all of the false alarm check bit(s) and the padding bit(s) are 0.

9. The apparatus for according to claim 7, wherein the false alarm check unit is further configured to check the false alarm check bit(s), to determine that the control signaling does not belong to the user if not all of the false alarm check bit(s) are 0, and to check the padding bit(s) if all of the false alarm check bit(s) are 0; and the false alarm check unit is further configured to determine that the control signaling belongs to the user if all of the padding bit(s) are 0, and to determine that the control signaling does not belong to the user if not all of the padding bit(s) are 0.

10. The apparatus for according to claim 7, wherein the false alarm check unit is further configured to check the padding bit(s), to determine that the control signaling does not belong to the use if not all of the padding bit(s) are 0, and to check the false alarm check bit(s) if all of the padding bit(s) are 0; and the false alarm check unit is further configured to determine that the control signaling belongs to the user if all of the false alarm check bit(s) are 0, and to determine that the control signaling does not belong to the user if not all of the false alarm check bit(s) are 0.

11. The apparatus according to claim 7, wherein the control signaling is control signaling for activating physical resources, or control signaling for releasing physical resources, or control signaling for reconfiguring physical resources.

12. The apparatus according to claim 7, wherein the control signaling is control signaling for scheduling physical resources in a Long Term Evolution (LTE) system.

13. The apparatus according to claim 7, wherein the apparatus for checking a false alarm is a logic unit or a physical unit of a user equipment (UE).

14. A computer program product for checking a false alarm, having a set of instructions stored thereon, the set of instructions being executable by one or more processors and the set of instructions comprising:

instructions for receiving the control signaling;

instructions for performing Cyclic Redundancy Check (CRC) on the control signaling; and instructions for performing the false alarm check on the control signaling according to false alarm check bit(s) and padding bit(s) in the control signaling when the control signaling passes the CRC.

15. The computer program product according to claim 14, wherein the instructions for performing of the false alarm check on the control signaling according to the false alarm check bit(s) and the padding bit(s) in the control signaling comprises:

instructions for checking the false alarm check bit(s) and the padding bit(s) in the control signaling at the same time; and instructions for determining that the control signaling belongs to the user if all of the false alarm check bit(s) and the padding bit(s) are 0; instructions for determining that the control signaling does not belong to the user if not all of the false alarm check bit(s) and the padding bit(s) are 0.

16. The computer program product according to claim 14, wherein the instructions for performing of the false alarm check on the control signaling according to the false alarm check bit(s) and the padding bit(s) in the control signaling comprises:

instructions for checking the false alarm check bit(s);

instructions for determining that the control signaling does not belong to the user if not all of the false alarm check bit(s) are 0; instructions for further checking the padding bit(s) if all of the false alarm check bit(s) are 0; and instructions for determining that the control signaling belongs to the user if all of the padding bit(s) are 0; instructions for determining that the control signaling does not belong to the user if not all of the padding bit(s) are 0.

17. The computer program product according to claim 14, wherein the instructions for performing of the false alarm check on the control signaling according to the false alarm check bit(s) and the padding bit(s) in the control signaling comprises:

instructions for checking the padding bit(s);

instructions for determining that the control signaling does not belong to the user if not all of the padding bit(s) are 0; instructions for further checking the false alarm check bit(s) if all of the padding bit(s) are 0; and instructions for determining that the control signaling belongs to the user if all of the false alarm check bit(s) are 0; instructions for determining that the control signaling does not belong to the user if not all of the false alarm check bit(s) are 0.

18. The computer program product according to claim 14, wherein the control signaling is control signaling for activating physical resources, or control signaling for releasing physical resources, or control signaling for reconfiguring physical resources.

19. The computer program product according to claim 14, wherein the control signaling is control signaling for scheduling physical resources in a Long Term Evolution (LTE) system.

* * * * *